United States Patent
Wang

(10) Patent No.: US 11,577,342 B2
(45) Date of Patent: Feb. 14, 2023

(54) PULSED LASER PRINTING MODULE FOR CONTACT LENS

(71) Applicant: JUN HE TECHNOLOGY CO., LTD., Changhua County (TW)

(72) Inventor: Chiang-Chuan Wang, Lukang Township, Changhua County (TW)

( * ) Notice: Subject to any disclaimer, the term of this patent is extended or adjusted under 35 U.S.C. 154(b) by 1085 days.

(21) Appl. No.: 16/232,521

(22) Filed: Dec. 26, 2018

(65) Prior Publication Data

US 2019/0210154 A1 Jul. 11, 2019

(30) Foreign Application Priority Data

Dec. 14, 2017 (TW) ................. 106143951

(51) Int. Cl.

| | |
|---|---|
| B23K 26/362 | (2014.01) |
| B29D 11/00 | (2006.01) |
| G02C 7/04 | (2006.01) |
| B29C 33/42 | (2006.01) |
| B23K 26/0622 | (2014.01) |
| B29C 33/38 | (2006.01) |
| B23K 26/00 | (2014.01) |
| B23K 26/40 | (2014.01) |
| B23K 26/359 | (2014.01) |
| B23K 103/04 | (2006.01) |
| B23K 101/20 | (2006.01) |

(52) U.S. Cl.
CPC ........ *B23K 26/362* (2013.01); *B23K 26/0006* (2013.01); *B23K 26/0624* (2015.10); *B23K 26/359* (2015.10); *B23K 26/40* (2013.01); *B29C 33/3842* (2013.01); *B29C 33/42* (2013.01); *B29D 11/0048* (2013.01); *G02C 7/04* (2013.01); *B23K 2101/20* (2018.08); *B23K 2103/04* (2018.08); *B29D 11/00038* (2013.01); *B29K 2905/12* (2013.01); *G02C 7/046* (2013.01)

(58) Field of Classification Search
CPC .. B23K 26/40; B23K 26/362; B23K 26/0624; B23K 26/0006; B23K 26/359; B29D 11/0048; B29D 11/00038; B29C 33/42; B29C 33/3842
See application file for complete search history.

(56) References Cited

U.S. PATENT DOCUMENTS

| | | | |
|---|---|---|---|
| 6,433,303 B1 * | 8/2002 | Liu | B23K 26/0624 219/121.75 |
| 2010/0012506 A1 * | 1/2010 | Prichystal | B23H 5/06 205/655 |
| 2015/0035881 A1 * | 2/2015 | Chou | B29D 11/00903 347/2 |

* cited by examiner

Primary Examiner — Mathieu D Vargot

(57) ABSTRACT

A pulsed laser printing module for a contact lens, comprises a steel mold, a pulsed laser device and a forming case. The steel mold is configured for transferring pigment. The pulsed laser device is configured for transmitting ultrashort laser pulses having pulse time widths less than $10^{-9}$ seconds. The ultrashort laser pulses etch the surface of the steel mold to remove a coating of the steel mold to form an etched layer. The forming case has a lower member and an upper member. The lower member is a concavity, and an inner surface of the lower member is provided with a lower curved surface. The upper member is provided with a protrusion corresponding to the lower member, and an outer surface of the protrusion is provided with an upper curved surface corresponding to the lower curved surface. The protrusion is capable of being placed in a concavity of the lower member to form a gap between the lower curved surface and the upper curved surface.

3 Claims, 6 Drawing Sheets

PULSED LASER PRINTING MODULE FOR CONTACT LENS

BACKGROUND OF INVENTION

1. Field of Invention

The present invention relates to a printing module for contact lens, and more particularly to a pulsed laser printing module for contact lens.

2. Description of the Related Art

In recent years, colored contact lenses has added aesthetics and makeup in addition to the original medical functions of vision correction. However, the general color contact lens is made by transferring a color film onto a transparent contact lens. As shown in the FIGS. 11 and 12, an etched layer 61 is formed on the surface of a metal mold 60 by a laser etching process, and a color film 62 is form by filling coloring agent. Afterward, the contact lens and the color film 62 are combined to form a color contact lens.

However, the above-mentioned conventional structure has some shortcomings: The etched layer 61 has multiple U-shaped grooves 611 form by the laser (see also FIG. 12), and also a raw edge 612 is formed on the outer periphery of the etched layer 61, which blocks the flow of the coloring agent and affects the integrity of the color film 62. Furthermore, when the transfer head wants to bring the color film 62 from the metal mold 60 to the contact lens, the transfer head might have difficulty to take out the color film, and the transfer head might be scratched by the raw edge 612.

Therefore, it is desirable to provide a pulsed laser printing module for contact lens to mitigate and/or obviate the aforementioned problems.

SUMMARY OF THE INVENTION

An objective of present invention is to provide a pulsed laser printing module for contact lens, which is capable of improving the above-mention problems.

In order to achieve the above mentioned objective, a pulsed laser printing module for a contact lens, comprises a steel mold, a pulsed laser device and a forming case. The steel mold is configured for transferring pigment. The pulsed laser device is configured for transmitting ultrashort laser pulses having pulse time widths less than $10^{-9}$ seconds. The ultrashort laser pulses etch the surface of the steel mold to remove a coating of the steel mold to form an etched layer. The forming case has a lower member and an upper member. The lower member is a concavity, and an inner surface of the lower member is provided with a lower curved surface. The upper member is provided with a protrusion corresponding to the lower member, and an outer surface of the protrusion is provided with an upper curved surface corresponding to the lower curved surface. The protrusion is capable of being placed in a concavity of the lower member to form a gap between the lower curved surface and the upper curved surface.

Other objects, advantages, and novel features of invention will become more apparent from the following detailed description when taken in conjunction with the accompanying drawings.

Figure 1:
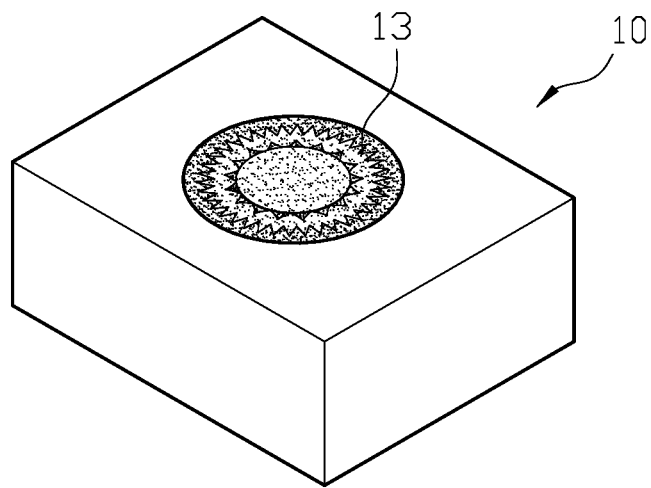
FIG. 1 is a perspective view showing the colored layer formed on the steel mold according to a preferred embodiment of the present invention.
Figure 2:
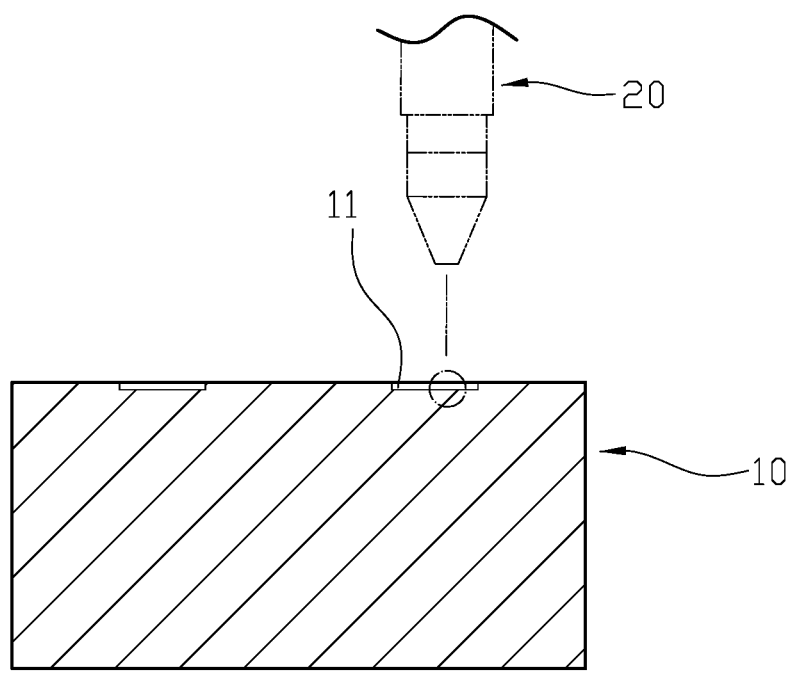
FIG. 2 is a schematic view showing the etching operation performed on the steel mold according to the preferred embodiment of the present invention.
Figure 7:
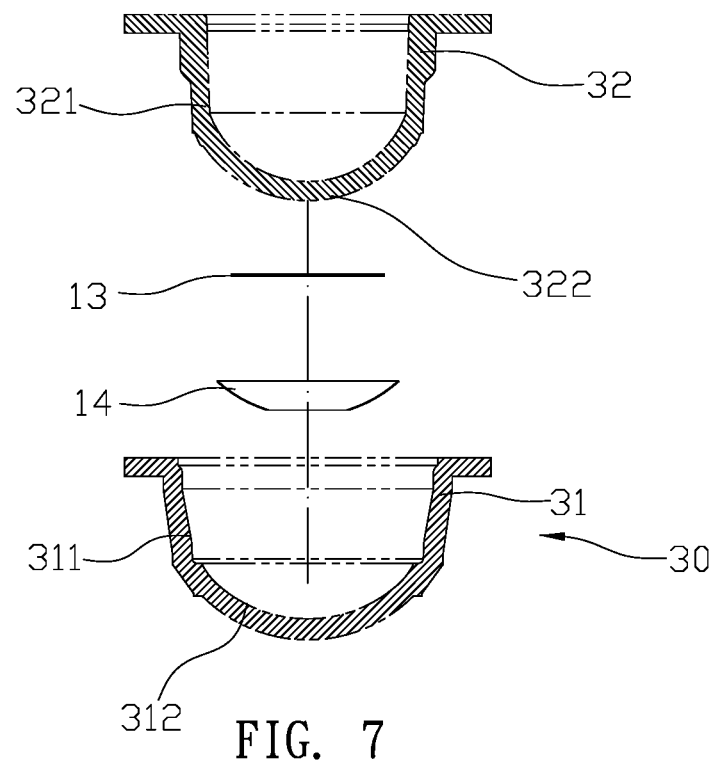
FIG. 7 is a schematic view showing the protective layer and the colored layer placed in the forming case according to the preferred embodiment of the present invention.
Figure 8:
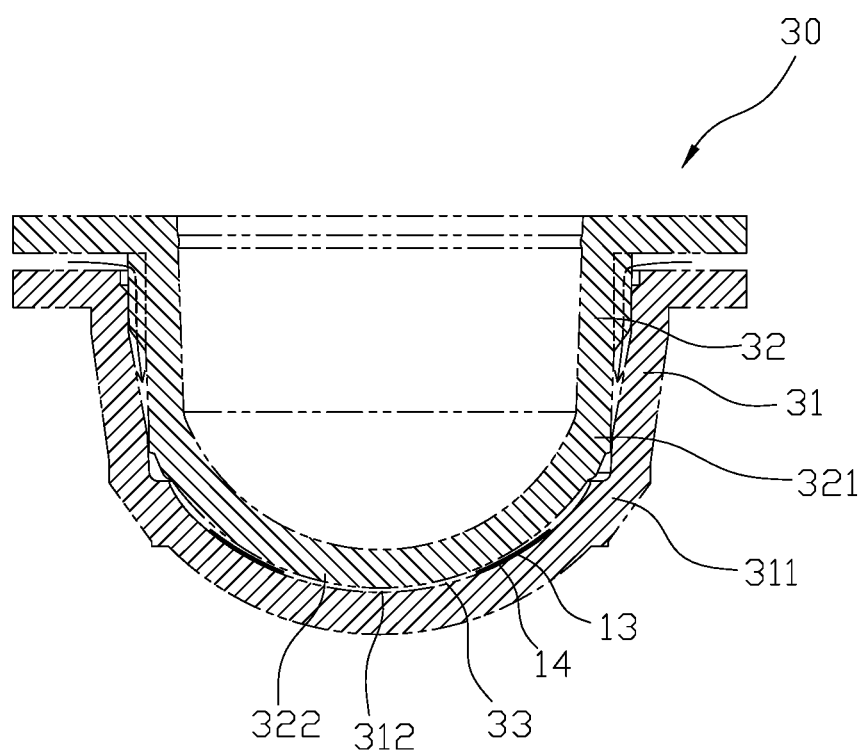
FIG. 8 is a cross-sectional view of the protective layer and the colored layer confined within the forming case according to the preferred embodiment of the present invention.

DETAILED DESCRIPTION OF THE PREFERRED EMBODIMENT s Please refer to FIGS. 1, 2 and FIGS. 7, 8. A pulsed laser printing module for a contact lens, comprises a steel mold 10, a pulsed laser device 20 and a forming case 30. The steel mold 10 is configured for transferring pigment. The pulsed laser device 20 is configured for transmitting ultrashort laser pulses having pulse time widths less than $10^{-9}$ seconds. The ultrashort laser pulses etch the surface of the steel mold 10 to remove a coating of the steel mold 10 to form an etched layer. The forming case 30 has a lower member 31 and an upper member 32. The lower member 31 is a concavity 311, and an inner surface of the lower member is provided with a lower curved surface 312. The upper member 32 is provided with a protrusion 321 corresponding to the lower member 31, and an outer surface of the protrusion 321 is provided with an upper curved surface 322 corresponding to the lower curved surface 312. The protrusion 321 is capable of being placed in a concavity 311 of the lower member 31 to form a gap 33 between the lower curved surface 312 and the upper curved surface 322.

Figure 3:
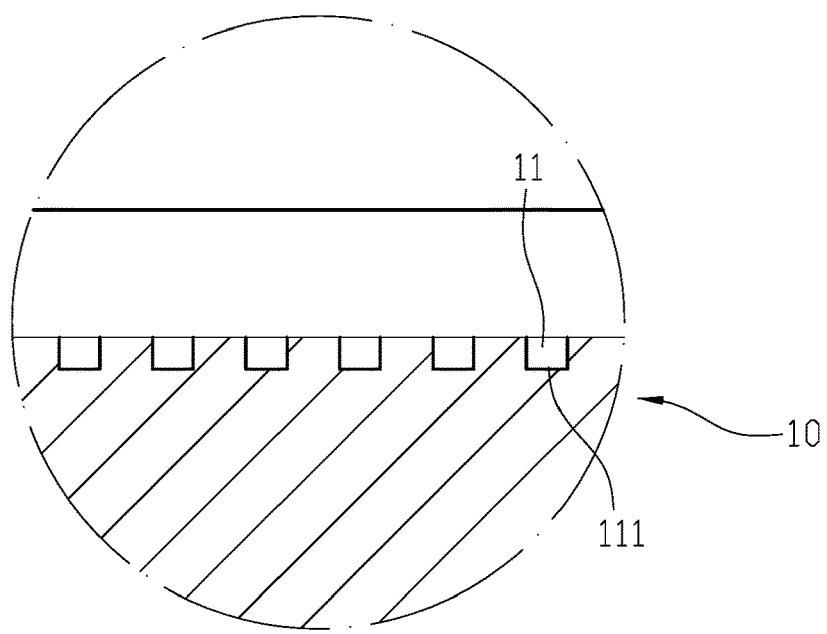
FIG. 3 is a partially enlarged schematic view showing the etched layer on the steel mold according to the preferred embodiment of the present invention
Figure 4:
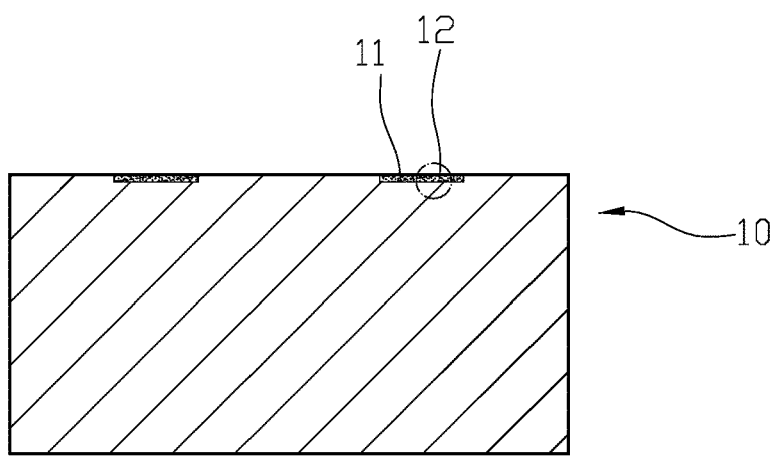
FIG. 4 is a schematic view showing the coating with a pigment of the steel mold according to the preferred embodiment of the present invention.
Figure 5:
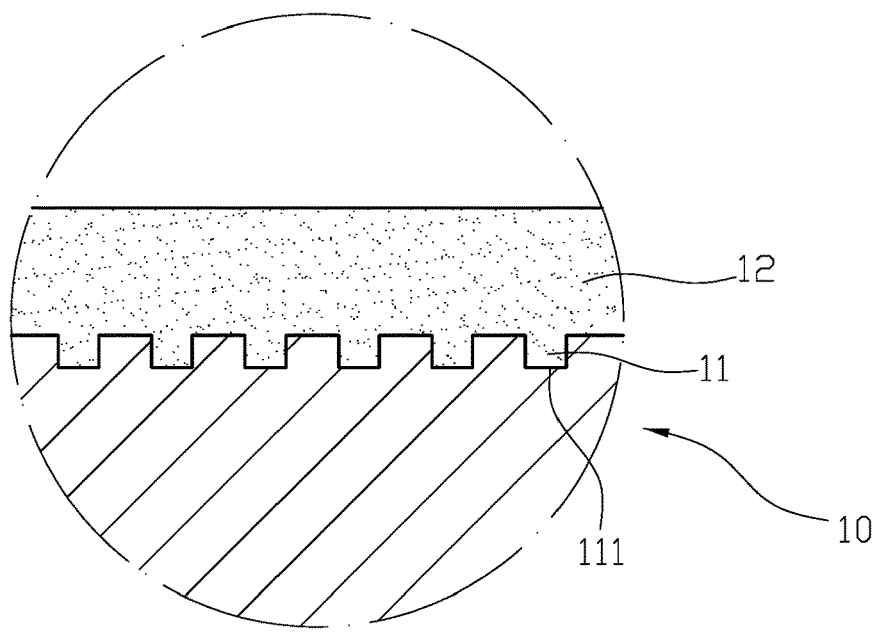
FIG. 5 is a partially enlarged schematic view showing the steel mold coated with a pigment according to the preferred embodiment of the present invention.
Figure 6:
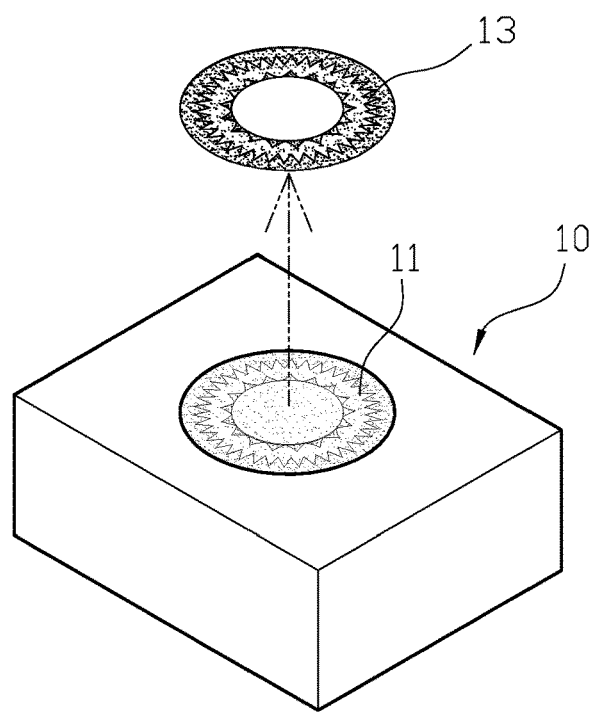
FIG. 6 is a schematic view showing the colored layer transferred by the steel mold according to the preferred embodiment of the present invention.
Figure 9:
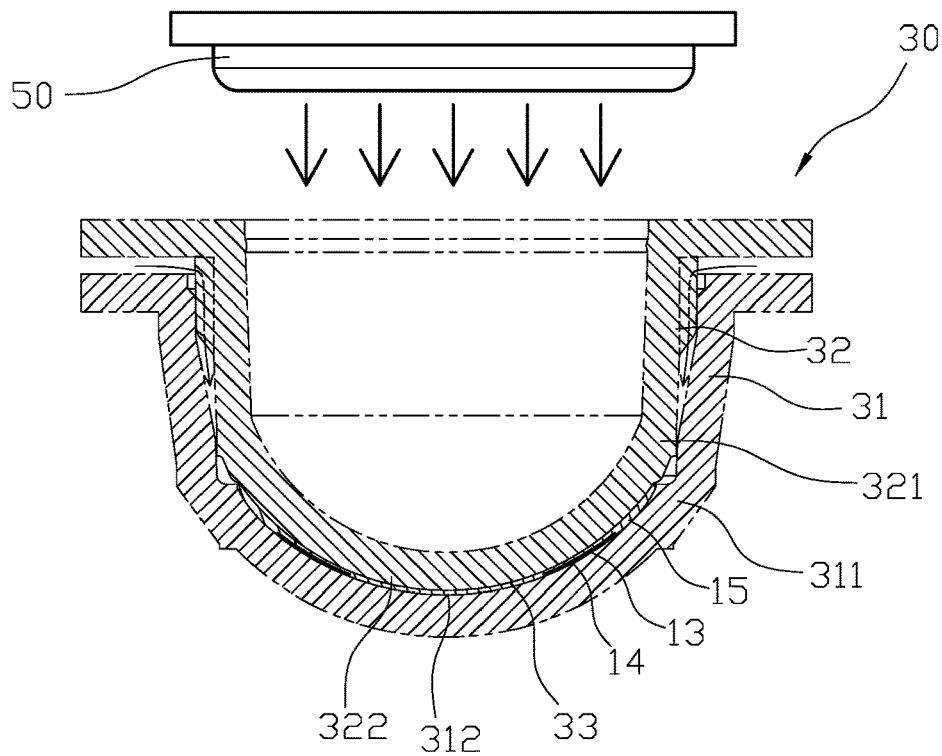
FIG. 9 is a partially enlarged schematic view showing the molding of the polymer material filled into the forming case according to the preferred embodiment of the present invention.
Figure 10:
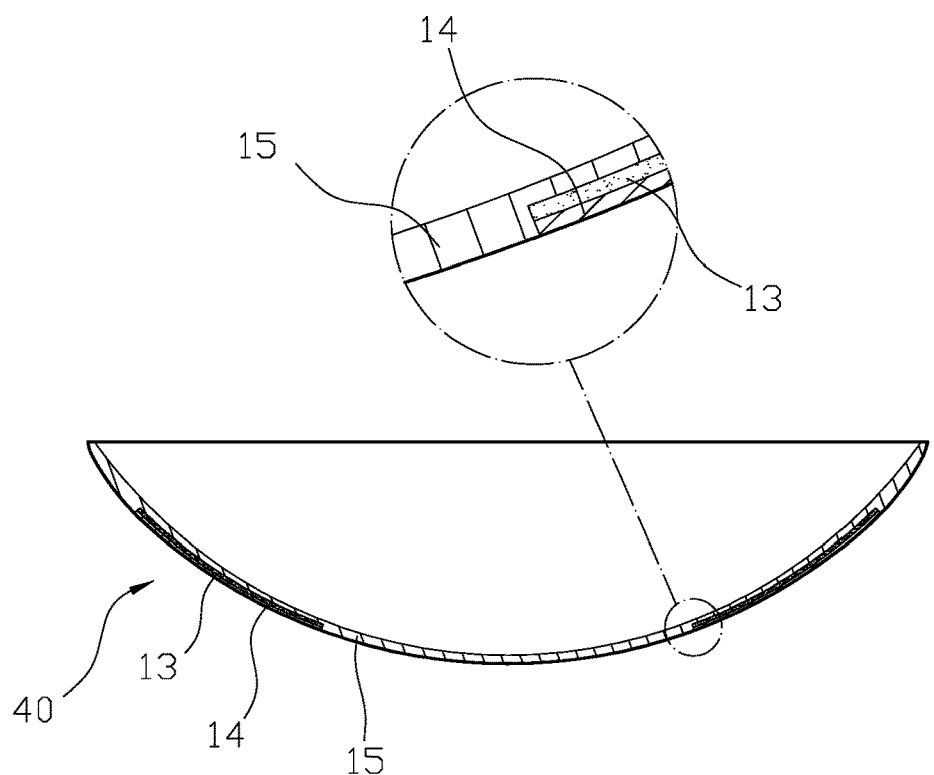
FIG. 10 is a partially enlarged schematic view showing the curing process of the contact lens according to the preferred embodiment of the present invention.
Figure 11:
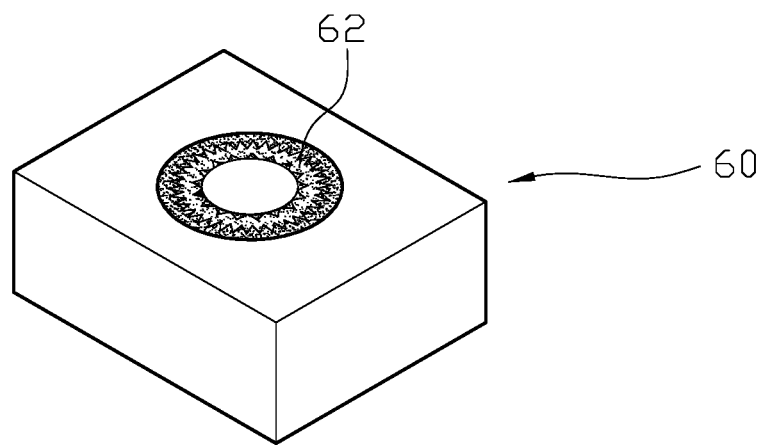
FIG. 11 is a perspective view of the colored layer formed by the steel mold according to prior art.
Figure 12:
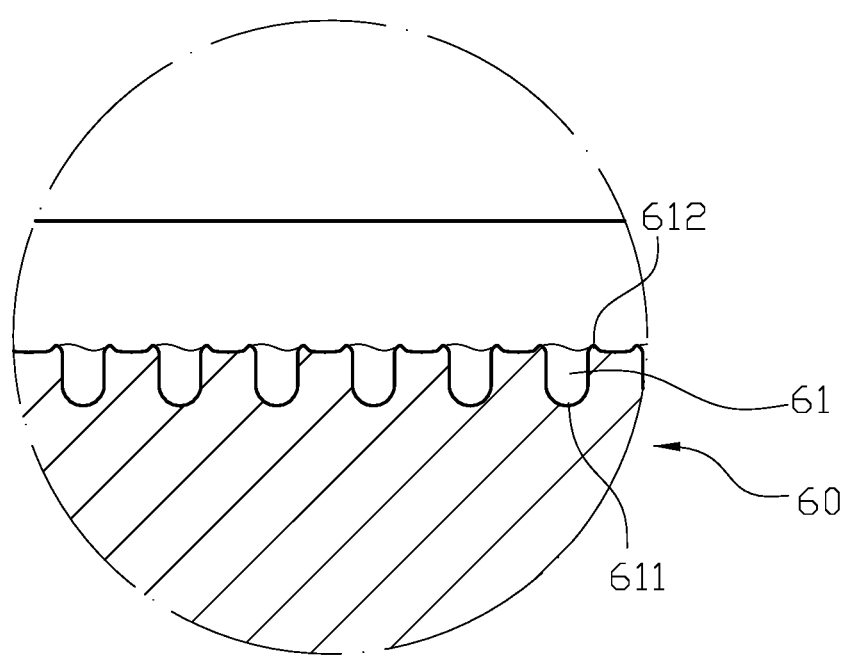
FIG. 12 is a schematic view showing the etched layer formed by laser etching process according to prior art.

When the contact lens is formed by the above-mentioned structural module, the steel mold 10 is used as a platform of the ultrashort pulsed laser etching operation, as shown in FIGS. 2 to 6. The surface of the steel mold 10 is etched by the ultrashort pulsed laser to form the etched layer 11. The high dense ultrashort pulsed laser can only act on a few atoms of the target substance without causing the surrounding material to heat up or melt, so that the bottom of the etched layer 11 maintains a horizontal bottom surface 111 without raw edge. After the etching process is completed, a pigment 12 is filled into the etched layer 11 to form a colored layer 13, and then the uncured colored layer 13 is transferred from the steel mold 10. A forming operation of a contact lens 40 can be performed through the forming case 30, as shown in FIGS. 7, 8, 9, and 10. A protective layer 14 and the colored layer 13 are placed in the concavity 311 of the lower member 31 of the forming case 30 and overlaid on the lower curved surface 312, and then the protrusion 321 of the upper member 32 is placed in to form the gap 33 between the upper curved surface 322 of the protrusion 321 and the lower curved surface 312. Finally a polymer material 15 for the contact lens 40 is injected into the gap 33 of the forming case 30, and the lower member 31 and the upper member 32 are pressed together to press and cure the polymer material 15 with the colored layer 13 and the protective layer 14 between the upper curved surface 322 and the lower curved surface 312 simultaneously. The colored layer 13 is interposed between the protective layer 14 and the polymer material 15 to form a contact lens 40. Furthermore, the pigment 12 filled into the steel mold 10 may be added with a curing solvent to accelerate the bonding effect of the protective layer 14, the colored layer 13 and the polymer material 15. In addition, during the curing process of the contact lens 40, a UV light source 50 is employed to perform the curing process to improve the bonding efficiency and composition yield of the protective layer 14, the colored layer 13 and the polymer material 15.

With the structure of the above specific embodiment, the following benefits can be obtained: the pulsed laser device 20 is employed to etch the steel mold 10, and the bottom surface 111 of the etched layer 11 has a flat surface and a clean periphery edge. When the pigment 12 is filled into the etched layer 11, the colored layer 13 is preserved completely.

Although the present invention has been explained in relation to its preferred embodiment, it is to be understood that many other possible modifications and variations can be made without departing from the spirit and scope of invention as hereinafter claimed.

What is claimed is:

1. A pulsed laser printing module for a contact lens, comprising:
   a steel mold for transferring pigment for the contact lens;
   a pulsed laser device for transmitting ultrashort laser pulses having pulse time widths less than $10^{-9}$ seconds;
   wherein:
   the ultrashort laser pulses etch the surface of the steel mold to remove a coating of the steel mold to form an etched layer;
   the etched layer of the steel mold has a flat bottom and a smooth edge; and
   pigment is fillable onto the etched layer and transferring from the steel mold to form a colored layer of the contact lens;
   the pulsed laser printing module further comprising:
   a forming case having a lower member and an upper member, the lower member being a concavity, an inner surface of the lower member provided with a lower curved surface, the upper member provided with a protrusion corresponding to the lower member, an outer surface of the protrusion provided with an upper curved surface corresponding to the lower curved surface;
   wherein the protrusion is configured to be placed in the lower member to form a gap, and the gap is configured to accept an additive polymer material to combine a protective layer and the colored layer together to form a contact lens, the colored layer interposed between the protective layer and the polymer material.

2. The pulsed laser printing module for contact lens as claimed in claim 1 further comprising: a UV light source for performing a curing process to the protective layer, the colored layer and the polymer material.

3. The pulsed laser printing module for contact lens as claimed in claim 1, wherein the pigment further comprises a curing solvent.

* * * * *